United States Patent [19]
Jones, Jr.

[11] 3,950,264
[45] Apr. 13, 1976

[54] SCHIFF-BASE LIQUID CRYSTALS DOPED TO RAISE DYNAMIC SCATTERING CUTOFF FREQUENCY

[75] Inventor: Freeman B. Jones, Jr., Westlake Village, Calif.

[73] Assignee: Rockwell International Corporation, El Segundo, Calif.

[22] Filed: May 7, 1973

[21] Appl. No.: 357,565

[52] U.S. Cl. ............ 252/299; 23/230 LC; 252/408; 350/150; 350/160 LC
[51] Int. Cl.² ........................ C09K 3/34; G02F 1/13
[58] Field of Search ...... 252/408, 299; 350/160 LC, 350/150; 23/230 LC

[56] References Cited
UNITED STATES PATENTS

| | | | |
|---|---|---|---|
| 3,597,043 | 8/1971 | Dreyer | 350/150 |
| 3,656,834 | 4/1972 | Haller et al. | 252/408 |
| 3,697,150 | 10/1972 | Wysochi | 252/408 |
| 3,698,449 | 10/1972 | Sorkin et al. | 350/160 LC |
| 3,756,694 | 9/1973 | Soree et al. | 252/408 |
| 3,803,050 | 4/1974 | Haas et al. | 350/160 LC |
| 3,809,456 | 5/1974 | Goldmacher et al. | 252/299 |
| 3,814,700 | 6/1974 | Aviram et al. | 252/408 LC |
| 3,816,113 | 6/1974 | Haas et al. | 252/408 |
| 3,838,059 | 9/1974 | Wong | 252/299 |
| 3,904,797 | 9/1975 | Jones, Jr. et al. | 252/408 |

OTHER PUBLICATIONS

Proceedings of the IEEE, "Nematic Liquid Crystal Materials For Displays", L. T. Creagh, Vol. 61, No. 7, pp. 814–822 (July 1973).

*Primary Examiner*—Benjamin R. Padgett
*Assistant Examiner*—T. S. Gron
*Attorney, Agent, or Firm*—H. Fredrick Hamann; G. Donald Weber, Jr.; Robert Ochis

[57] ABSTRACT

When a nematic liquid crystal has been doped to maximize its contrast ratio, its cutoff frequency (that above which all dynamic scattering ceases) can be further increased up to about 500% by adding small amounts of an ionic dopant to the doped nematic crystal. The ionic dopant is $R_1R_2R_3R_4N^+B^-(R_5)_4$, where $R_1$, $R_2$, $R_3$, $R_4$ and $R_5$ may be the same or different alkyl or aryl groups. The alkyl groups having the formula $CH_3(CH_2)_n$, where n is a positive integer or zero and the aryl groups being either phenyl or biphenyl. Ammonium boride⁻18, $(C_{18}H_{37})_2(CH_3)_2N^+B^-(C_6H_5)_4$, is the preferred ionic dopant.

8 Claims, No Drawings

SCHIFF-BASE LIQUID CRYSTALS DOPED TO RAISE DYNAMIC SCATTERING CUTOFF FREQUENCY

RELATED APPLICATIONS

This application is related to two other applications, each of which was filed on the same day as this application and which are assigned to the assignee of this application. The related applications are "Doping of Nematic Liquid Crystals" by Roger Chang, Freeman B. Jones, Jr., and Edward P. Parry; and "Homeotropic Alignment of Liquid Crystals in a Display Cell by Baked on Ionic Surfactants" by Ronald M. Govan and Freeman B. Jones, Jr. Each of these applications is incorporated herein by reference.

BACKGROUND OF THE INVENTION;

1. Field of the Invention

The invention relates to the field of liquid crystals and more particularly to the field of electro-optical display means utilizing electrically excited liquid crystals to provide a changeable visible display.

2. Prior Art

Many liquid crystals for use in electrically excited displays are known in the prior art. When excited by low frequency a.c. signals these crystals display dynamic scattering. In dynamic scattering incident light is scattered by internal scattering centers within the crystal.

As the excitation frequency is increased, the voltage required to maintain dynamic scattering increases. However, a fixed excitation voltage yields a fairly sharp frequency cutoff and for excitation at frequencies above the cutoff frequency no dynamic scattering takes place.

It has been observed that the cutoff frequency is a function of the temperature of the liquid crystal and is approximately halved for each 10°C drop in temperature. This effect restricts either the temperature range over which a given crystal can be used or the excitation frequency which can be used. Although this is not an electrical problem in systems where very low frequencies are available, it presents major problems in microelectronic circuits where low frequency oscillators are unduly bulky and expensive to fabricate. In addition, when the excitation frequency is in the neighborhood of 25 Hertz, a liquid crystal display flickers.

OBJECTS

A primary object of the present invention is to increase the dynamic scattering cutoff frequency of nematic and doped nematic liquid crystals.

Another object is to extend the useful temperature range of doped nematic liquid crystals in optical readouts for small microcircuit systems in which very low frequency oscillators are not employed.

SUMMARY

The invention increases the cutoff frequency ($f_c$) for a pure nematic liquid crystal by up to several thousand percent or when the crystal is already doped to maximize the contrast ratio, by up to 500% by adding small amounts of an ionic dopant of the general formula $R_1R_2R_3R_4N^+B^-(R_5)_4$ to the nematic crystal, where $R_1$, $R_2$, $R_3$, $R_4$ and $R_5$ may be the same or different alkyl groups [$CH_3(CH_2)_n$ where n is a positive integer or zero] or aryl groups [phenyl or biphenyl].

DESCRIPTION OF THE INVENTION

The dynamic scattering cutoff frequency ($f_c$) of a nematic liquid crystal is the driving frequency above which all dynamic scattering ceases. Liquid crystals are only useful as optical readout devices for electronic devices when dynamic scattering is present in the liquid crystal. This is because without dynamic scattering the liquid crystals display no contrast ratio — either reflective or transmissive.

At room temperature (25°C), most nematic liquid crystals which have been doped (with p-aminophenol, p-aminobenzoic acid or benzenesulfonic acid) have a cutoff frequency of 200 Hertz or less. A cutoff frequency of 200 Hertz is not a great problem in itself, since microelectronic oscillators operating at 200 Hertz are feasible and produce a usable readout. However, the cutoff frequency for a Schiff-base liquid crystal (LC) decreases by approximately one-half for every ten degree drop in temperature. Thus a nematic liquid crystal having an $f_c$ of 200 Hertz at 25°C would have an $f_c$ of about 100 Hertz at 15°C and about 50 Hertz at 5°C. At −5°C the $f_c$ would be about 25 Hertz. These low frequencies are difficult to obtain from microelectronic oscillators and produce displeasing displays which flicker.

In accordance with the invention, the nematic material (either pure or doped) is doped with small amounts of an ionic dopant having the general formula $R_1R_2R_3R_4N^+B^-(R_5)_4$, where the $R_1$, $R_2$, $R_3$, $R_4$ and $R_5$ may be the same or different alkyl groups [$CH_3(CH_2)_n$ where n is a positive integer or zero] or aryl groups [either phenyl or biphenyl] more preferrably an ionic dopant having the general formula $(R_1)_2(R_2)_2N^+B^-(R_5)_4$, where $R_1$, $R_2$ and $R_5$ are defined above and $R_1$ and $R_2$ are different groups. Ammonium boride-18 [$(C_{18}H_{37})_2(CH_3)_2 N^+B^-(C_6H_5)_4$] is the preferred dopant and is soluble up to about 500 ppm. This dopant increases the cutoff frequency of the pure material by up to several thousand percent and that of already doped material up to about 500%, thus partially alleviating the low temperature-low cutoff frequency problem and extending the useful temperature range of the crystal in microelectronic systems.

EXAMPLE I

A eutectic of substantially 55% very pure 4-methoxybenzylidene-4'-n-butylaniline (MBBA) and substantially 45% very pure 4-ethoxybenzylidene-4'-n-butylaniline (EBBA) both by weight was prepared. The resulting mixture had a conductivity of in the range of $10^{-12}$ to $10^{-10}$ $ohm^{-1}$-$cm^{-1}$ thus indicating its high purity. This eutectic which is a Schiff-base nematic liquid crystal had a contrast ratio of 1 and a cutoff frequency of 25 Hertz both values being measured at 25 volts and a temperature of 25°C with a liquid crystal thickness of about 19 microns. The mixture displayed nematic properties over a temperature range from −12°C to 60°C.

EXAMPLE II

The eutectic of Example I was doped with 0.5 weight % of p-aminophenol and 10 ppm p-toluenesulfonic acid. This doped mixture displayed a contrast ratio of 14 and had a cutoff frequency of 200 Hertz, both values being measured at 25 volts and 25°C with the same liquid crystals thickness as in Example I. The mixture displayed nematic properties from −16°C to 52°C.

EXAMPLE III

The eutectic of Example I was doped with 50 ppm ammonium boride-18. This mixture displayed a contrast ratio of 13 and had a cutoff frequency of 500 Hertz, both values being measured at 25 volts and 25°C with the same liquid crystal thickness as in Example I. The mixture displayed nematic properties from −12°C to 60°C.

EXAMPLE IV

The eutectic of Example I was doped with 0.5 weight % p-aminophenol; 10 ppm p-toluenesulfonic acid and 50 ppm ammonium boride-18. This is a combination of the dopants of Examples II and III. This mixture displayed a contrast ratio of 14 and had a critical frequency of 680 Hertz, both measured at 25 volts and 25°C with the same liquid crystal thickness as in Example I. The mixture displayed nematic properties from −16°C to 52°C.

The results of these examples are summarized in the following table.

5°C the Example IV mixture will have a cutoff frequency of approximately 170 Hertz.

What is claimed is:

1. A dynamic scattering type nematic liquid crystal doped with an ionic dopant of the formula $(R_1)_2(R_2)_2N^+B^-(R_3)_4$ where $R_1$, $R_2$ and $R_3$ are each selected from the group consisting of phenyl, biphenyl and $CH_3(CH_2)_n$, where $n$ is a positive integer or zero and $R_1$ and $R_2$ are different groups.

2. The composition of claim 1 wherein the ionic dopant is $(C_{18}H_{37})_2(CH_3)_2N^+B^-(C_6H_5)_4$.

3. A Schiff-base dynamic scattering-type nematic liquid crystal doped with an ionic dopant of the formula $(R_1)_2(R_2)_2N^+B^-(R_3)_4$ where $R_1$, $R_2$ and $R_3$ are each selected from the group consisting of phenyl, biphenyl and $CH_3(CH_2)_n$, where n is a positive integer or zero and $R_1$ and $R_2$ are different groups.

4. A Schiff-base dynamic scattering-type nematic liquid crystal doped with an ionic dopant of the formula $(C_{18}H_{37})_2(CH_3)_2N^+B^-(C_6H_5)_4$.

5. The composition of claim 4 wherein the dopant constitutes 50 ppm.

TABLE

| | Liquid Crystals | Contrast Ratio Dopant (Concentration) | Ionic Dopant (Concen.) | Contrast Ratio(25°C, 25v.)19μ | Cutoff Frequency (25°C,25v.) | Nematic Temperature Range | Percent Increase |
|---|---|---|---|---|---|---|---|
| Ex. I | 55% MBBA, 45% EBBA | None | None | 1 | 25 | −12 to 60 | |
| Ex. II | 55% MBBA, 45% EBBA | 0.5% p-aminophenol; 10 ppm p-toluenesulfonic acid | None | 14 | 200 | −16 to 52 | 800% over I |
| Ex. III | 55% MBBA, 45% EBBA | None | 50 ppm ammonium boride-18 | 13 | 500 | −12 to 60 | 2000% over I |
| Ex. IV | 55% MBBA, 45% EBBA | 0.5% p-aminophenol; 10 ppm p-toluenesulfonic acid | 50 ppm ammonium boride-18 | 14 | 680 | −16 to 52 | 240% over II 36% over III |

Clearly, the addition of small amounts of the ionic dopant to the nematic material, either doped or pure, drastically increases the cutoff frequency of the liquid crystal. When added to the crystal by itself, the ionic dopant improves the contrast ratio almost as much as the other dopants when the ionic dopant is not present.

This increase in cutoff frequency greatly increases the utility of the liquid crystal for display purposes in microelectronic systems, since the lower temperature limit of the Example IV mixture will be almost 20°C lower than that for the Example II mixture, in that, at 6. The liquid crystal of claim 5 wherein the mixture is further doped with 0.5 weight % p-aminophenol and 10 ppm p-toluenesulfonic acid.

7. The liquid crystal of claim 6 wherein the nematic material is substantially 55% 4-methoxybenzylidene-4′-n-butylaniline and substantially 45% 4-ethoxybenzylidene-4′-n-butylaniline by weight.

8. The liquid crystal of claim 3 wherein the nematic material is substantially 55% 4-methoxybenzylidene-4′-n-butylaniline and substantially 45% 4-ethoxybenzylidene-4′-n-butylaniline by weight.

* * * * *